US008706925B2

(12) United States Patent
Biswas et al.

(10) Patent No.: US 8,706,925 B2
(45) Date of Patent: Apr. 22, 2014

(54) ACCELERATING MEMORY OPERATIONS BLOCKED BY ORDERING REQUIREMENTS AND DATA NOT YET RECEIVED

(75) Inventors: Sukalpa Biswas, Fremont, CA (US); Hao Chen, San Ramon, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 13/221,461

(22) Filed: Aug. 30, 2011

(65) Prior Publication Data

US 2013/0054902 A1 Feb. 28, 2013

(51) Int. Cl.
*G06F 13/00* (2006.01)
*G06F 12/00* (2006.01)

(52) U.S. Cl.
USPC .............................. 710/40; 711/154; 718/102

(58) Field of Classification Search
USPC .............................. 710/40; 711/154; 718/102
See application file for complete search history.

(56) References Cited

U.S. PATENT DOCUMENTS

| 5,581,703 | A | 12/1996 | Baugher |
| 5,719,800 | A | 2/1998 | Mittal et al. |
| 6,484,240 | B1 * | 11/2002 | Cypher et al. ................ 711/141 |
| 6,597,691 | B1 | 7/2003 | Anderson |
| 6,628,609 | B2 | 9/2003 | Chapman |
| 6,826,704 | B1 | 11/2004 | Pickett |
| 6,947,970 | B2 | 9/2005 | Berry |
| 6,965,563 | B1 | 11/2005 | Hospodor |
| 7,054,968 | B2 | 5/2006 | Shrader et al. |
| 7,145,904 | B2 | 12/2006 | Zhao |
| 7,155,554 | B2 | 12/2006 | Vinogradov |
| 7,277,975 | B2 | 10/2007 | Vinogradov |
| 7,350,028 | B2 | 3/2008 | Cameron |
| 7,548,545 | B1 | 6/2009 | Wittenschlaeger |
| 7,570,651 | B2 | 8/2009 | Haghighi |
| 7,596,139 | B2 | 9/2009 | Patel |
| 7,660,931 | B2 | 2/2010 | Hayter |
| 7,715,377 | B2 | 5/2010 | Mick |
| 7,912,951 | B2 | 3/2011 | Gulati et al. |
| 7,937,563 | B2 | 5/2011 | Naffziger et al. |
| 7,941,578 | B2 | 5/2011 | Kimoto et al. |
| 7,969,905 | B1 * | 6/2011 | Ciavattone .................... 370/252 |
| 2001/0010066 | A1 * | 7/2001 | Chin et al. .................... 711/108 |
| 2002/0181395 | A1 | 12/2002 | Foster et al. |
| 2004/0017820 | A1 | 1/2004 | Garinger |
| 2005/0052992 | A1 | 3/2005 | Cloonan |
| 2006/0092944 | A1 | 5/2006 | Wingard |

(Continued)

OTHER PUBLICATIONS

U.S. Appl. No. 13/008,180 entitled "Quality of Service (QoS)—Related Fabric Control" filed Jan. 18, 2011.

(Continued)

*Primary Examiner* — Hong Kim
(74) *Attorney, Agent, or Firm* — Rory D. Rankin; Meyertons, Hood, Kivlin, Kowert & Goetzel, P.C.

(57) ABSTRACT

A memory controller, system, and method for accelerating blocking memory operations. A memory controller reorders memory operations so as to maximize efficient use of the memory device bus. When data for a newer memory operation is retrieved from memory and ready to be returned to a source device, the newer memory operation can be held up waiting for an older memory operation to be completed. In response, the memory controller forwards a push request for the older memory operation to a memory channel unit. The memory channel unit then sets a push bit of the older memory operation, which expedites the scheduling of the older memory operation.

22 Claims, 10 Drawing Sheets

(56) References Cited

U.S. PATENT DOCUMENTS

| | | |
|---|---|---|
| 2006/0123169 A1 | 6/2006 | Chai et al. |
| 2008/0069125 A1 | 3/2008 | Reed |
| 2008/0298397 A1 | 12/2008 | Kwan |
| 2009/0138682 A1 | 5/2009 | Capps, Jr. et al. |
| 2009/0207866 A1 | 8/2009 | Cholas et al. |
| 2010/0005470 A1 | 1/2010 | Simon et al. |
| 2010/0169525 A1 | 7/2010 | Natanel et al. |
| 2010/0191993 A1 | 7/2010 | Chaudhry et al. |
| 2010/0278195 A1 | 11/2010 | Wagh |
| 2010/0318713 A1 | 12/2010 | Deshpande |
| 2011/0072178 A1 | 3/2011 | Mace |

OTHER PUBLICATIONS

U.S. Appl. No. 13/008,156 entitled "Write Traffic Shaper Circuits" filed Jan. 18, 2011.

U.S. Appl. No. 13/008,184 entitled "Hierarchical Fabric Control Circuits" filed Jan. 18, 2011.

Bolotin E et al: "QNoC: QoS architecture 1-12 and design process for Network on Chip", Journal of Systems Architecture, Elsevier BV, N L, vol. 58, 28 February 2884 (2884-82-28), pp. 1-18, XP882619446, ISSN: 1383-7621 *Chapter I and II *.

Maze et al: "Reconfigurable Issue Logic for Microprocessor Power/Performance Throttling"; Downloaded from the Internet; http://groups.csail.mit.edu/cag/6.893-f2000/project/maze_check1.pdf; downloaded on Apr. 12, 2011.

Zhang, et al.: "Hardward Execution Throttling for Multi-core Resource Management"; -Proceeding, USENIX'09, Proceedings of the 2009 conference on USENIX Annual technical conference, pp. 23-23, USENIX Association Berkeley, CA, USA, 2009.

International Search Report & Written Opinion from PCT/US2012/02057 dated Mar. 19, 2012.

U.S. Appl. No. 13/008,171 entitled "Fabric Limiter Circuits" filed Jan. 18, 2011.

Search report in application No. EP 12150817.0-2416 mailed Mar. 2, 2012.

U.S. Appl. No. 13/285,361 entitled "Processor Instruction Issue Throttling" filed Oct. 31, 2011.

U.S Appl. No. 13/217,513 entitled "Proportional Memory Operation Throttling" filed Aug. 25, 2011.

* cited by examiner

ACCELERATING MEMORY OPERATIONS BLOCKED BY ORDERING REQUIREMENTS AND DATA NOT YET RECEIVED

BACKGROUND

1. Field of the Invention

This invention is related computing systems, and more particularly to the field of memory controllers.

2. Description of the Related Art

Digital systems generally include a memory system formed from semiconductor memory devices such as static random access memory (SRAM), dynamic random access memory (DRAM), synchronous DRAM (SDRAM), double data rate (DDR, DDR2, DDR3, etc.) SDRAM including low power versions (LPDDR, LPDDR2, etc.) SDRAM, etc. With many technologies, the memory system is volatile meaning it generally retains data only when powered on but not when powered off. While such volatility may in some cases be seen as a disadvantage, such technologies often provide low latency access as compared to nonvolatile memories such as Flash memory, magnetic storage devices such as disk drives, or optical storage devices such a compact disk (CD), digital video disk (DVD), and BluRay drives.

The memory devices forming the memory system generally have a low level interface to read and write the memory according to memory device-specific protocols. The sources that generate transactions typically communicate via a higher level interface such as a bus, a point-to-point packet interface, etc. The sources can be processors, peripheral devices such as input/output (I/O) devices, audio and video devices, etc. Generally, the transactions include read memory operations to transfer data from the memory to the device and write memory operations to transfer data from the source to the memory. The term "transaction" may be used interchangeably with "memory operation" throughout this disclosure. Additionally, "read memory operations" may be more succinctly referred to herein as "read operations" or "reads", and similarly "write memory operations" may be more succinctly referred to herein as "write operations" or "writes".

Accordingly, a memory controller is typically included to receive the memory operations from the higher level interface and to control the memory devices to perform the received operations. The memory controller generally also includes queues to capture the memory operations, and can include circuitry to improve performance. For example, some memory controllers reorder memory operations in order to achieve high efficiency on the interfaces to the memory devices. However, some sources require that memory operations are completed in the order in which they were transmitted. As a result, it is possible for read data to be buffered in the memory controller, ready to be returned to a source, but waiting on read data from an earlier transaction that has been delayed due to a reordering of memory operations.

SUMMARY

In one embodiment, a memory controller is contemplated which may include an agent interface unit coupled to receive memory operations from multiple sources. The memory controller may also include one or more memory channel units coupled to one or more memory devices. To improve memory efficiency, the order of memory operations may be rearranged by the memory controller. In some cases, when the memory operations are reordered as they approach the memory device from the source, the data returned as a result of read operations may be out of order compared to how the memory operations were originally transmitted by the source. For some sources and bus protocols, the order in which read data is returned should match the order in which the operations were requested.

As a result, in certain situations, older memory operations may need to be completed before more recent memory operations can complete to the source, even though the more recent memory operations may be of higher priority or may have already obtained the read data from memory. Therefore, in various embodiments, older embodiments may be accelerated. In some embodiments, a push request for an older memory operation may be transmitted from an agent interface unit to a memory channel unit. In response to receiving the push request, the memory channel unit may expedite the scheduling of the older memory operation. Subsequently, the read data from the older memory operation may be returned to the source, which will allow the stalled more recent memory operations to complete to the source.

BRIEF DESCRIPTION OF THE DRAWINGS

The following detailed description makes reference to the accompanying drawings, which are now briefly described.

Figure 1:
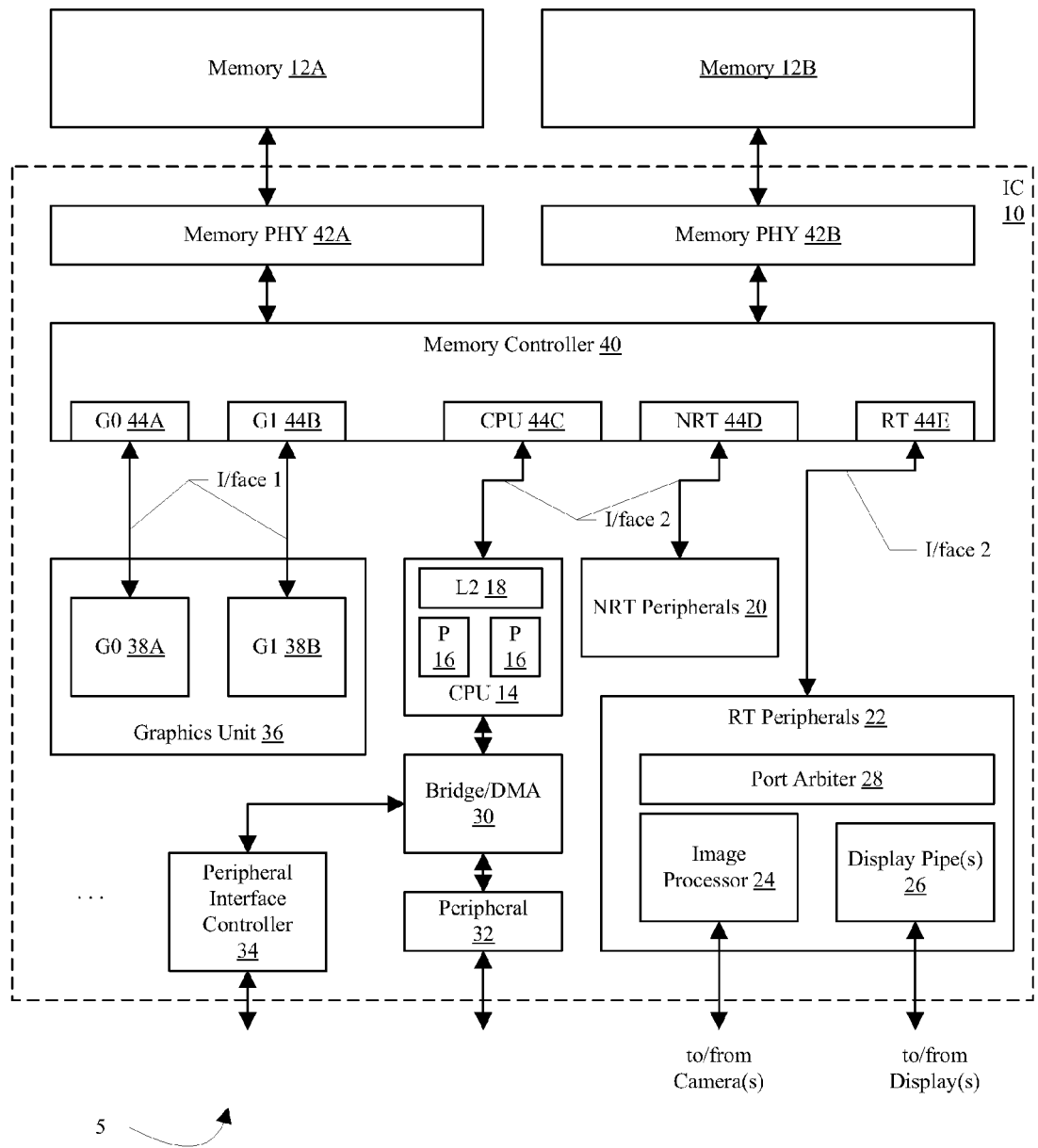
FIG. 1 is a block diagram of one embodiment of a system including a memory controller.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

This specification includes references to "one embodiment". The appearance of the phrase "in one embodiment" in different contexts does not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a processor unit . . . ." Such a claim does not foreclose the system from including additional components (e.g., a memory device, input device, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

DETAILED DESCRIPTION OF EMBODIMENTS

Turning now to FIG. 1, a block diagram of one embodiment of a system 5 is shown. In the embodiment of FIG. 1, the system 5 includes an integrated circuit (IC) 10 coupled to external memories 12A-12B. In the illustrated embodiment, the integrated circuit 10 includes a central processor unit (CPU) block 14 which includes one or more processors 16 and a level 2 (L2) cache 18. Other embodiments may not include L2 cache 18 and/or may include additional levels of cache. Additionally, embodiments that include more than two processors 16 and that include only one processor 16 are contemplated. The integrated circuit 10 further includes a set of one or more non-real time (NRT) peripherals 20 and a set of one or more real time (RT) peripherals 22. In the illustrated embodiment, the RT peripherals include an image processor 24, one or more display pipes 26, and a port arbiter 28. Other embodiments may include more or fewer image processors 24, more or fewer display pipes 26, and/or any additional real time peripherals as desired. The image processor 24 may be coupled to receive image data from one or more cameras in the system 5. Similarly, the display pipes 26 may be coupled to one or more display controllers (not shown) which control one or more displays in the system. In the illustrated embodiment, the CPU block 14 is coupled to a bridge/direct memory access (DMA) controller 30, which may be coupled to one or more peripheral devices 32 and/or one or more peripheral interface controllers 34. The number of peripheral devices 32 and peripheral interface controllers 34 may vary from zero to any desired number in various embodiments. The system 5 illustrated in FIG. 1 further includes a graphics unit 36 comprising one or more graphics controllers such as G0 38A and G1 38B. The number of graphics controllers per graphics unit and the number of graphics units may vary in other embodiments. As illustrated in FIG. 1, the system 5 includes a memory controller 40 coupled to one or more memory physical interface circuits (PHYs) 42A-42B. The memory PHYs 42A-42B are configured to communicate on pins of the integrated circuit 10 to the memories 12A-12B. The memory controller 40 also includes a set of ports 44A-44E. The ports 44A-44B are coupled to the graphics controllers 38A-38B, respectively via a first type of interface (I/face 1). The CPU block 14 is coupled to the port 44C via a second type of interface (I/face 2). The NRT peripherals 20 and the RT peripherals 22 are coupled to the ports 44D-44E, respectively, via the second type of interface. The number of ports included in a memory controller 40 may be varied in other embodiments, as may the number of memory controllers. The number of memory PHYs 42A-42B and corresponding memories 12A-12B may be one or more than two in other embodiments.

In one embodiment, each port 44A-44E may be associated with a particular type of traffic. For example, in one embodiment, the traffic types may include RT traffic, NRT traffic, and graphics traffic. Other embodiments may include other traffic types in addition to, instead of, or in addition to a subset of the above traffic types. Each type of traffic may be characterized differently (e.g., in terms of requirements and behavior), and the memory controller may handle the traffic types differently to provide higher performance based on the characteristics. For example, RT traffic requires servicing of each memory operation within a specific amount of time. If the latency of the operation exceeds the specific amount of time, erroneous operation may occur in the RT peripheral. For example, image data may be lost in the image processor 24 or the displayed image on the displays to which the display pipes 26 are coupled may visually distort. RT traffic may be characterized as isochronous, for example. On the other hand, graphics traffic may be relatively high bandwidth, but is not latency-sensitive. NRT traffic, such as from the processors 16, is more latency-sensitive for performance reasons but survives higher latency. That is, NRT traffic may generally be serviced at any latency without causing erroneous operation in the devices generating the NRT traffic. Similarly, the less latency-sensitive but higher bandwidth graphics traffic may be generally serviced at any latency. Other NRT traffic may include audio traffic, which is relatively low bandwidth and generally may be serviced with reasonable latency. Most peripheral traffic may also be NRT (e.g., traffic to storage devices such as magnetic, optical, or solid state storage).

By providing ports 44A-44E associated with different traffic types, the memory controller 40 may be exposed to the different traffic types in parallel, and may thus be capable of making better decisions about which memory operations to service prior to others based on traffic type. In some embodiments, each port may be dedicated exclusively to either RT or NRT traffic. In other embodiments, the ports may be associated with the particular traffic type, but other traffic types may be supported on the port. In an embodiment, graphics traffic may be considered to be NRT traffic, but having visibility to the graphics traffic separate from other NRT traffic may be useful for bandwidth balancing among the other NRT sources and the RT source. Similarly, having the processor traffic separate from the other NRT sources may be useful in bandwidth balancing. In the illustrated embodiment, the RT port 44E may be associated with RT traffic and the remaining ports 44A-44D may be associated with NRT traffic.

Generally, a port may be a communication point on the memory controller 40 to communicate with one or more sources. In some cases, the port may be dedicated to a source (e.g., the ports 44A-44B may be dedicated to the graphics controllers 38A-38B, respectively). In other cases, the port may be shared among multiple sources (e.g., the processors 16 may share the CPU port 44C, the NRT peripherals 20 may share the NRT port 44D, and the RT peripherals such as the display pipes 26 and the image processor 24 may share the RT port 44E. A port may be coupled to a single interface to communicate with the one or more sources. Thus, when sources share an interface, there may be an arbiter on the sources' side of the interface to select between the sources. For example, the L2 cache 18 may serve as an arbiter for the CPU port 44C to the memory controller 40. The port arbiter 28 may serve as an arbiter for the RT port 44E, and a similar port arbiter (not shown) may be an arbiter for the NRT port 44D. The single source on a port or the combination of sources on a port may be referred to as an agent.

Each port 44A-44E is coupled to an interface to communicate with its respective agent. The interface may be any type of communication medium (e.g., a bus, a point-to-point interconnect, etc.) and may implement any protocol. In some embodiments, the ports 44A-44E may all implement the same interface and protocol. In other embodiments, different ports may implement different interfaces and/or protocols. For example, the embodiment illustrated in FIG. 1 includes the graphics controllers 38A-38B using one type of interface/protocol and the CPU block 14, the NRT peripherals 20 and the RT peripherals 22 using another type of interface/protocol. An interface may refer to the signal definitions and electrical properties of the interface, and the protocol may be the logical definition of communications on the interface (e.g., including commands, ordering rules, coherence support if any, etc.). Supporting more than one interface on the various ports 44A-44E may eliminate the need to convert from one interface supported by a source/agent and the interface supported by the memory controller 40, which may improve performance in some embodiments. Additional, some embodiments of the integrated circuit 10 may include circuitry purchased from a third party as a prepackaged unit typically referred to in the industry as intellectual property (IP). The IP may be "hard" (in which case it is specified as a netlist of circuits that are laid out and placed on the IC as a block) or "soft" (in which case it is specified as a synthesizable block that can be synthesized with other blocks to be included in the integrated circuit 10). Both soft and hard IP include a specified interface and protocol, which generally cannot be changed by the designer of the integrated circuit 10 (at least without payment of fees to the third party that owns the IP). Accordingly, supporting multiple interfaces/protocols may permit easier inclusion of third party IP.

In an embodiment, each source may assign a quality of service (QoS) parameter to each memory operation transmitted by that source. The QoS parameter may identify a requested level of service for the memory operation. Memory operations with QoS parameter values requesting higher levels of service may be given preference over memory operations requesting lower levels of service. For example, each of the interfaces to the ports 44A-44E in FIG. 1 may include a command (Cmd), a flow identifier (FID), and/or a QoS parameter (QoS). The command may identify the memory operation (e.g., read or write). A read command/memory operation causes a transfer of data from the memory 12A-12B to the source, whereas a write command/memory operation causes a transfer of data from the source to the memory 12A-12B. Commands may also include commands to program the memory controller 40. For example, which address ranges are mapped to which memory channels, bandwidth sharing parameters, etc. may all be programmable in the memory controller 40. The FID may identify a memory operation as being part of a flow of memory operations. A flow of memory operations may generally be related, whereas memory operations from different flows, even if from the same source, may not be related. A portion of the FID (e.g., a source field) may identify the source, and the remainder of the FID may identify the flow (e.g., a flow field). Thus, an FID may be similar to a transaction ID, and some sources may simply transmit a transaction ID as an FID. In such a case, the source field of the transaction ID may be the source field of the FID and the sequence number (that identifies the transaction among transactions from the same source) of the transaction ID may be the flow field of the FID. Sources that group transactions as a flow, however, may use the FIDs differently. Alternatively, flows may be correlated to the source field (e.g., operations from the same source may be part of the same flow and operations from a different source are part of a different flow). The ability to identify transactions of a flow may be used in a variety of ways described below (e.g., QoS upgrading, reordering, etc.).

Thus, a given source may be configured to use QoS parameters to identify which memory operations are more important to the source (and thus should be serviced prior to other memory operations from the same source), especially for sources that support out-of-order data transmissions with respect to the address transmissions from the source. Furthermore, the QoS parameters may permit sources to request higher levels of service than other sources on the same port and/or sources on other ports.

In some embodiments, different traffic types may have different definitions of QoS parameters. That is, the different traffic types may have different sets of QoS parameters. The meaning of a given QoS parameter value depends on the set of QoS parameters from which it is drawn. For example, a set of RT QoS parameters may be defined and a set of NRT QoS parameters may be defined. Thus, an RT QoS parameter value is assigned meaning within the RT QoS parameter set and an NRT QoS parameter value is assigned meaning within the NRT QoS parameter set. Other embodiments may implement the same QoS parameter set on all ports or among all traffic types.

The memory controller 40 may be configured to process the QoS parameters received on each port 44A-44E and may use the relative QoS parameter values to schedule memory operations received on the ports with respect to other memory operations from that port and with respect to other memory operations received on other ports. More specifically, the memory controller 40 may be configured to compare QoS parameters that are drawn from different sets of QoS parameters (e.g., RT QoS parameters and NRT QoS parameters) and may be configured to make scheduling decisions based on the QoS parameters.

The QoS parameters may thus be values that are transmitted with memory operations, and which may be used in the memory controller to identify requested QoS levels. The QoS levels may be relative to other levels, and may specify which memory operations are preferred to be selected prior to others having lower QoS levels. Thus, the QoS levels may function as a sort of priority after interpretation by the memory controller 40 to consider QoS levels defined in different sets, although the priority can be balanced by other factors.

In some embodiments, the memory controller 40 may be configured to upgrade QoS levels for pending memory operations. Various upgrade mechanisms may be supported. For example, the memory controller 40 may be configured to upgrade the QoS level for pending memory operations of a flow responsive to receiving another memory operation from the same flow that has a QoS parameter specifying a higher QoS level. This form of QoS upgrade may be referred to as in-band upgrade, since the QoS parameters transmitted using the normal memory operation transmission method also serve as an implicit upgrade request for memory operations in the same flow. The memory controller 40 may be configured to push pending memory operations from the same port or source, but not the same flow, as a newly received memory operation specifying a higher QoS level. As another example, the memory controller 40 may be configured to couple to a sideband interface from one or more agents, and may upgrade QoS levels responsive to receiving an upgrade request on the sideband interface. In another example, the memory controller 40 may be configured to track the relative age of the pending memory operations. The memory controller 40 may be configured to upgrade the QoS level of aged memory operations at certain ages. The ages at which upgrade occurs may depend on the current QoS parameter of the aged memory operation.

The memory controller 40 may be configured to determine the memory channel addressed by each memory operation received on the ports, and may be configured to transmit the memory operations to the memory 12A-12B on the corresponding channel. The number of channels and the mapping of addresses to channels may vary in various embodiments and may be programmable in the memory controller. The memory controller may use the QoS parameters of the memory operations mapped to the same channel to determine an order of memory operations transmitted into the channel. That is, the memory controller may reorder the memory operations from their original order of receipt on the ports. Additionally, during processing in the channel, the memory operations may be reordered again at one or more points. At each level of reordering, the amount of emphasis placed on the QoS parameters may decrease and factors that affect memory bandwidth efficiency may increase. Once the memory operations reach the end of the memory channel pipeline, the operations may have been ordered by a combination of QoS levels and memory bandwidth efficiency. High performance may be realized in some embodiments.

The processors 16 may implement any instruction set architecture, and may be configured to execute instructions defined in that instruction set architecture. The processors 16 may employ any microarchitecture, including scalar, superscalar, pipelined, superpipelined, out of order, in order, speculative, non-speculative, etc., or combinations thereof. The processors 16 may include circuitry, and optionally may implement microcoding techniques. The processors 16 may include one or more level 1 (L1) caches coupled to level 2 (L2) cache 18. Other embodiments may include multiple levels of caches in the processors 16, and the cache 18 may be the next level down in the hierarchy. The cache 18 may employ any size and any configuration (set associative, direct mapped, etc.).

The graphics controllers 38A-38B may be any graphics processing circuitry. Generally, the graphics controllers 38A-38B may be configured to render objects to be displayed into a frame buffer. The graphics controllers 38A-38B may include graphics processors that may execute graphics software to perform a part or all of the graphics operation, and/or hardware acceleration of certain graphics operations. The amount of hardware acceleration and software implementation may vary from embodiment to embodiment.

The NRT peripherals 20 may include any non-real time peripherals that, for performance and/or bandwidth reasons, are provided independent access to the memory 12A-12B. That is, access by the NRT peripherals 20 is independent of the CPU block 14, and may proceed in parallel with CPU block memory operations. Other peripherals such as the peripheral 32 and/or peripherals coupled to a peripheral interface controlled by the peripheral interface controller 34 may also be non-real time peripherals, but may not require independent access to memory. Various embodiments of the NRT peripherals 20 may include video encoders and decoders, scaler/rotator circuitry, image compression/decompression circuitry, etc.

As mentioned above, the RT peripherals 22 may include the image processor 24 and the display pipes 26. The display pipes 26 may include circuitry to fetch one or more frames and to blend the frames to create a display image. The display pipes 26 may further include one or more video pipelines. The result of the display pipes 26 may be a stream of pixels to be displayed on the display screen. The pixel values may be transmitted to a display controller for display on the display screen. The image processor 26 may receive camera data and process the data to an image to be stored in memory.

The bridge/DMA controller 30 may comprise circuitry to bridge the peripheral(s) 32 and the peripheral interface controller(s) 34 to the memory space. In the illustrated embodiment, the bridge/DMA controller 30 may bridge the memory operations from the peripherals/peripheral interface controllers through the CPU block 14 to the memory controller 40. The CPU block 14 may also maintain coherence between the bridged memory operations and memory operations from the processors 16/L2 Cache 18. The L2 cache 18 may also arbitrate the bridged memory operations with memory operations from the processors 16 to be transmitted on the CPU interface to the CPU port 44C. The bridge/DMA controller 30 may also provide DMA operation on behalf of the peripherals 32 and the peripheral interface controllers 34 to transfer blocks of data to and from memory. More particularly, the DMA controller may be configured to perform transfers to and from the memory 12A-12B through the memory controller 40 on behalf of the peripherals 32 and the peripheral interface controllers 34. The DMA controller may be programmable by the processors 16 to perform the DMA operations. For example, the DMA controller may be programmable via descriptors. The descriptors may be data structures stored in the memory 12A-12B that describe DMA transfers (e.g., source and destination addresses, size, etc.). Alternatively, the DMA controller may be programmable via registers in the DMA controller (not shown).

The peripherals 32 may include any desired input/output devices or other hardware devices that are included on the integrated circuit 10. For example, the peripherals 32 may include networking peripherals such as one or more networking media access controllers (MAC) such as an Ethernet MAC or a wireless fidelity (WiFi) controller. An audio unit including various audio processing devices may be included in the peripherals 32. One or more digital signal processors may be included in the peripherals 32. The peripherals 32 may include any other desired functional such as timers, an on-chip secrets memory, an encryption engine, etc., or any combination thereof.

The peripheral interface controllers 34 may include any controllers for any type of peripheral interface. For example, the peripheral interface controllers may include various interface controllers such as a universal serial bus (USB) controller, a peripheral component interconnect express (PCIe) controller, a flash memory interface, general purpose input/output (I/O) pins, etc.

The memories 12A-12B may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with the integrated circuit 10 in a chip-on-chip configuration, a package-on-package configuration, or a multi-chip module configuration.

The memory PHYs 42A-42B may handle the low-level physical interface to the memory 12A-12B. For example, the memory PHYs 42A-42B may be responsible for the timing of the signals, for proper clocking to synchronous DRAM memory, etc. In one embodiment, the memory PHYs 42A-42B may be configured to lock to a clock supplied within the integrated circuit 10 and may be configured to generate a clock used by the memory 12.

It is noted that other embodiments may include other combinations of components, including subsets or supersets of the components shown in FIG. 1 and/or other components. While one instance of a given component may be shown in FIG. 1, other embodiments may include one or more instances of the given component. Similarly, throughout this detailed description, one or more instances of a given component may be included even if only one is shown, and/or embodiments that include only one instance may be used even if multiple instances are shown.

It is noted that other embodiments of the memory controller 40 may not implement multiple ports, but may still implement QoS parameters, different QoS parameters/levels for different traffic types or classes such as NRT and RT, and QoS upgrading.

Figure 2:
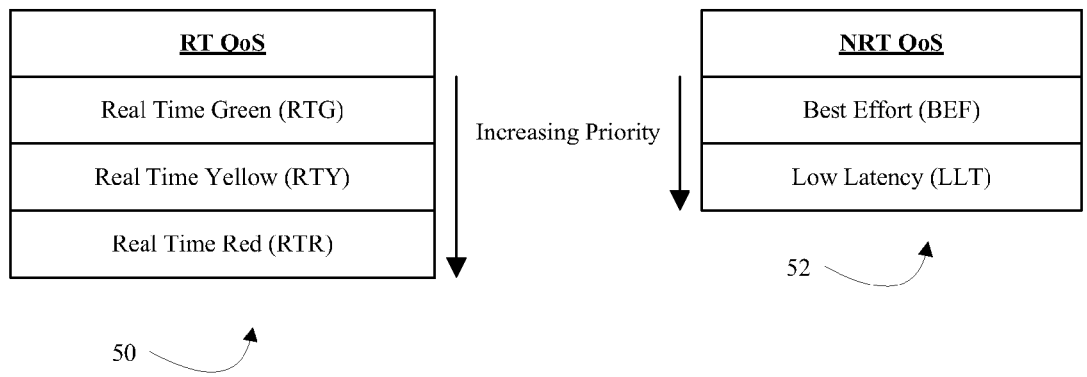
FIG. 2 is a block diagram of one embodiment of QoS levels that may be defined for RT and NRT classes of traffic.

Turning next to FIG. 2, a pair of tables 50 and 52 are shown illustrating a definition of a set of RT QoS levels and a set of NRT QoS levels, respectively, for one embodiment. Other embodiments may include additional or substitute levels, and other embodiments may include additional levels in combination with a subset of the illustrated levels. As illustrated by the arrows pointing downward next to the tables 50 and 52 in FIG. 2, the tables illustrate the QoS levels within a set in increasing priority. That is, the real time green (RTG) QoS level is the lowest priority RT QoS level; the real time yellow (RTY) QoS level is the medium priority RT QoS level; and the real time red (RTR) QoS level is the highest priority RT QoS level. Similarly, the best effort (BEF) QoS level is the lowest priority NRT QoS level and the low latency (LLT) QoS level is the highest priority NRT QoS level. The illustration of the RT QoS levels and the NRT QoS levels next to each other in FIG. 2 is not intended to indicate the relative priority of the RT QoS levels with regard to the NRT QoS levels. Instead, the memory controller 40 may determine such relative priorities based, in part, on other factors indicating the traffic that is being experienced by the memory controller 40 across the various types and ports.

The RTG, RTY, and RTR QoS levels may reflect relative levels of urgency from an RT source. That is, as the amount of time before data is needed by the RT source to prevent erroneous operation decreases, the QoS level assigned to each memory operation increases to indicate the higher urgency. By treating operations having higher urgency with higher priority, the memory controller 40 may return data to the RT source more quickly and may thus aid the correct operation of the RT source.

For example, the display pipe 26 may initiate the reading of frame data from the memory 12A-12B for the next frame to be displayed in the vertical blanking interval for the display. The frame is not actually displayed until the end of the vertical blanking interval, and thus the display pipe 26 may use the RTG level during this time period. As the frame begins to be displayed (i.e. the display controller begins reading frame pixels from the display pipe 26 output), the display pipe 26 may raise the QoS level of frame data read operations to the memory to the RTY level. For example, if the amount of frame data that is read ahead of the current pixel being displayed reduces below a first threshold, the level may be raised to RTY. At a second threshold (lower than the first threshold), the display pipe 26 may raise the QoS level of memory operations to RTR.

The BEF NRT QoS level may be a request to return the data as quickly as the memory controller 40 is able, once the needs of other flows of data are met. On the other hand, the LLT NRT QoS level may be a request for low latency data. NRT memory operations having the LLT QoS level may be treated more closely, in terms of priority with other memory transactions, than those having the BEF QoS level (at least in some cases). In other cases, the BEF and LLT QoS levels may be treated the same by the memory controller 40.

Figure 3:
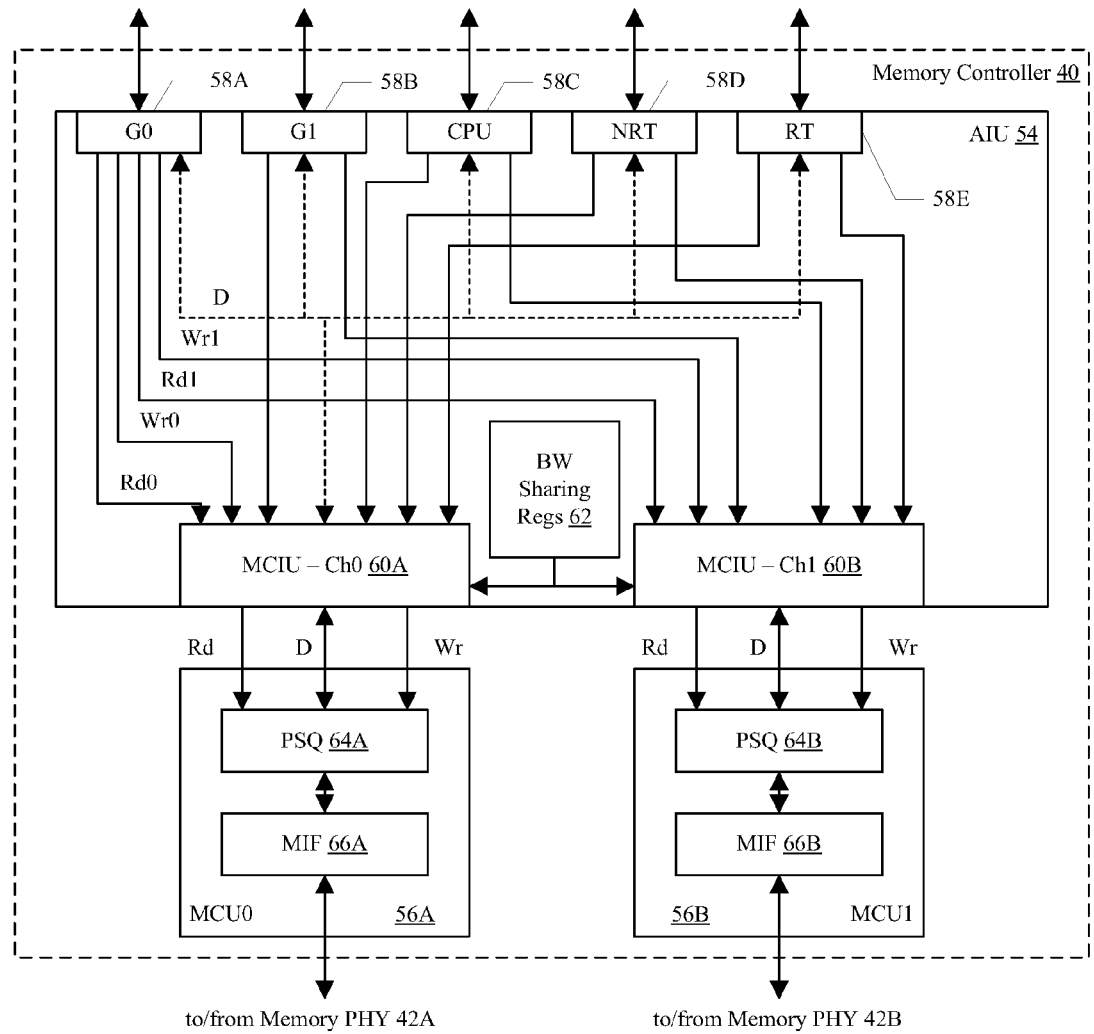
FIG. 3 is a block diagram of one embodiment of the memory controller shown in FIG. 1.

Turning next to FIG. 3, a block diagram of one embodiment of the memory controller 40 is shown. In the embodiment of FIG. 3, the memory controller 40 includes an agent interface unit (AIU) 54 and one or more memory channel units 56A-56B. There may be one memory channel unit 56A-56B for each memory channel included in a given embodiment, and other embodiments may include one channel or more than two channels. As illustrated in FIG. 3, the AIU 54 may include multiple port interface units 58A-58E. More particularly, there may be a port interface unit 58A-58E for each port 44A-44E on the memory controller 40. The AIU 54 may further include memory channel interface units (MCIUs) 60A-60B (one for each memory channel unit 56A-56B). The AIU 54 may further include one or more bandwidth sharing registers 62, which may be programmable to indicate how bandwidth is to be shared among the ports. The port interface units 58A-58E may be coupled to receive memory operations and to receive/transmit data and responses on the corresponding port, and may also be coupled to the MCIUs 60A-60B. The MCIUs 60A-60B may further be coupled to the bandwidth sharing registers 62 and to the corresponding MCU 56A-56B. As illustrated in FIG. 3, the MCUs 56A-56B may each include a presorting queue (PSQ) 64 and a memory interface circuit (MIF) 66. The PSQs 64 are coupled to the corresponding MCIUs 60A-60B and to the MIF 66 in the same MCU 56A-56B. The MIF 66 in each MCU 56A-56B is coupled to the corresponding memory PHY 42A-42B.

The AIU 54 may be configured to receive memory operations on the ports 44A-44E and to switch the memory operations to the channels addressed by those memory operations, using the QoS parameters of the memory operations as a factor in deciding which memory operations to transmit to one of the MCUs 56A-56B prior to other memory operations to the same MCU 56A-56B. Other factors may include the bandwidth sharing controls to divide bandwidth on the memory channels among the ports.

More particularly, each port interface unit 58A-58E may be configured to receive the memory operations from the corresponding port 44A-44E, and may be configured to determine the memory channel to which a given memory operation is directed. The port interface unit 58A-58E may transmit the memory operation to the corresponding MCIU 60A-60B, and may transmit reads separately from writes in the illustrated embodiment. Thus, for example, the port interface unit 58A may have a Rd0 connection and a Wr0 connection to the MCIU 60A for read operations and write operations, respectively. Similarly, the port interface unit 58A may have a Rd1 and a Wr1 connection to the MCIU 60B. The other port interface units 58B-58E may have similar connections to the MCIU 60A-60B. There may also be a data interface to transmit read data from the port interface units 58A-58B to the MCIUs 60A-60B, illustrated generally as the dotted "D" interface for the MCIU 60A in FIG. 3.

The MCIUs 60A-60B may be configured to queue the memory operations provided by the port interface units 58A-58E, and to arbitrate among the memory operations to select operations to transmit to the corresponding MCUs 56A-56B. The arbitration among operations targeted at a given memory channel may be independent of the arbitration among operations targeted at other memory channels.

The MCIUs 60A-60B may be coupled to the bandwidth sharing registers 62, which may be programmed to indicate how memory bandwidth on a channel is to be allocated to memory operations in the given channel. For example, in one embodiment, the MCIUs 60A-60B may use a deficit-weighted round-robin algorithm to select among the ports when there is no high priority traffic present (e.g., RTR or RTY QoS levels in the RT traffic). When RTR or RTY traffic is present, a round-robin mechanism may be used to select among the ports that have RTR/RTY traffic. The weights in the deficit weighted round-robin mechanism may be programmable to allocate relatively more bandwidth to one port than another. The weights may be selected to favor processor traffic over the graphics and NRT ports, for example, or to favor the graphics ports over other ports. Any set of weights may be used in various embodiments. Other embodiments may measure the bandwidth allocations in other ways. For example, percentages of the total bandwidth may be used. In other embodiments, a credit system may be used to control the relative number of operations from each port that are selected. Generally, however, operations may be selected based on both QoS parameters and on bandwidth sharing requirements in various embodiments.

The MCUs 56A-56B are configured to schedule memory operations from their queues to be transmitted on the memory channel. The MCUs may be configured to queue reads and writes separately in the PSQs 64, and may be configured to arbitrate between reads and writes using a credit based system, for example. In the credit-based system, reads and writes are allocated a certain number of credits. The number of write credits and read credits need not be equal. Each scheduled memory operation may consume a credit. Once both the write credits and the read credits are reduced to zero or less and there is a pending transaction to be scheduled, both credits may be increased by the corresponding allocated number of credits. Other embodiments may use other mechanisms to select between reads and writes. In one embodiment, the credit system may be part of the arbitration mechanism between reads and writes (along with measurements of the fullness of the write queue). That is, as the write queue becomes more full, the priority of the writes in the arbitration mechanism may increase. Additional details are set forth below.

In one embodiment, the QoS parameters of the write operations may be eliminated on entry into the PSQs 64. The read operations may retain the QoS parameters, and the QoS parameters may affect the read scheduling from the PSQs 64.

In an embodiment, the MCUs 56A-56B may schedule memory operations in bursts of operations (each operation in the burst consuming a credit). If the burst reduces the credit count to zero, the burst may be permitted to complete and may reduce the credit count to a negative number. When the credit counts are increased later, the negative credits may be accounted for, and thus the total number of credits after increase may be less than the allocated credit amount.

To create bursts of memory operations for scheduling, the MCUs 56A-56B may group memory operations into affinity groups. A memory operation may be said to exhibit affinity with another memory operation (or may be said to be affine to the other memory operation) if the operations may be performed efficiently on the memory interface when performed in close proximity in time. Efficiency may be measured in terms of increased bandwidth utilization. For example, SDRAM memories are characterized by a page that can be opened using an activate command (along with an address of the page). The size of the page may vary from embodiment to embodiment, and generally may refer to a number of contiguous bits that may be available for access once the activate command has been transmitted. Asynchronous DRAM memories may similarly have a page that may be opened by asserting a row address strobe control signal and by providing the row address. Two or more memory operations that access data in the same page may be affine, because only one activate/RAS may be needed on the interface for the memory operations. SDRAM memories also have independent banks and ranks A bank may be a collection of memory cells within an SDRAM chip that may have an open row (within which page hits may be detected). A rank may be selected via a chip select from the memory controller, and may include one or more SDRAM chips. Memory operations to different ranks or banks may also be affine operations, because they do not conflict and thus do not require the page to be closed and a new page to be opened. Memory operations may be viewed as affine operations only if they transfer data in the same direction (i.e. read operations may only be affine to other read operations, and similarly write operations may only be affine with other write operations). Memory operations to the same page (or to an open page) may be referred to as page hits, and memory operations to different banks/ranks may be referred to as bank hits and rank hits, respectively.

The MCUs 56A-56B may also be configured to schedule commands on the memory interface to the memories 12A-12B (through the memory PHYs 42A-42B) to perform the scheduled memory operations. More particularly, in an embodiment, the MCUs 56A-56B may be configured to presynthesize the commands for each memory operation and to enqueue the commands. The MCUs 56A-56B may be configured to schedule the commands to provide efficient use of the memory bandwidth. The MIFs 66 in each MCU 56A-56B may implement the presynthesis of commands and the scheduling of the commands, in an embodiment.

Figure 4:
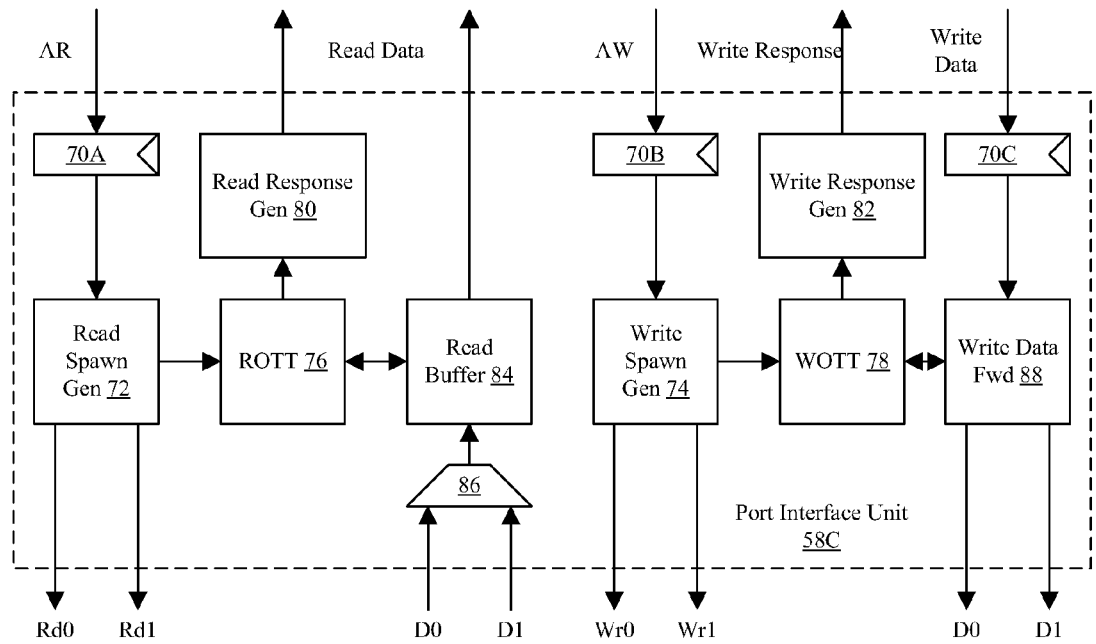
FIG. 4 is a block diagram of one embodiment of a port interface unit that may be included in one embodiment of an agent interface unit shown in FIG. 3.

Turning now to FIG. 4, a block diagram of one embodiment of the port interface unit 58C is shown. Other port interface circuits 58A-58B and 58D-58E may be similar, although there may be differences in implementation for port interface circuits that couple to different interfaces. In the illustrated embodiment, the port interface unit 58C includes buffers 70A-70B coupled to read (AR) and write (AW) interfaces to receive read and write memory operations, respectively, as illustrated in FIG. 4. The buffers 70A-70B are coupled to a read spawn generator 72 and a write spawn generator 74, respectively, which are coupled to the Rd0/Rd1 interfaces and the Wr0/Wr1 interfaces, respectively. The read spawn generator 72 is coupled to a read outstanding transaction table (ROTT) 76, and the write spawn generator 74 is coupled to a write outstanding transaction table (WOTT) 78. The ROTT 76 is coupled to a read response generator 80 which is configured to generate a read response on the interface. The ROTT 76 is also coupled to a read buffer 84, which is coupled to receive data from either MCU 56A-56B through a mux 86 and to provide read data on the interface. The WOTT 78 is coupled to a write response generator 82 which is configured to generate a write response on the interface. The WOTT 78 is also coupled to a write data forward buffer 88, which is coupled to provide data to the MCUs 56A-56B and is coupled to receive data from a buffer 70C, which is coupled to receive write data from the interface.

In one embodiment, the read buffer 84 may be monitored to determine when the amount of data in the read buffer 84 has reached a threshold. The threshold may be fixed or programmable, in various embodiments. In one embodiment, the ROTT 76 may be utilized to monitor the amount of data in the read buffer 84. For example, the number and status of active entries in the ROTT 76 may provide an indication of the amount of data in the read buffer 84.

When it has been detected that the amount of data in the read buffer 84 has exceeded a threshold, an oldest memory operation in the ROTT 76 may be identified, and then an identification (ID) of this oldest memory operation may be transmitted from the port interface unit 58C to the respective memory channel unit (MCU) 56. In one embodiment, the ID of the oldest memory operation may be sent with a push request to the respective MCU 56. When the MCU 56 receives the push request with the memory operation ID, the MCU 56 may accelerate the processing of the corresponding memory operation. Processing may be accelerated by raising the QoS level or by setting the push bit of the corresponding memory operation. The corresponding memory operation may be expedited and its read data may be returned to the read buffer 84 to facilitate the clearing of the held-up data.

For a read operation, the buffer 70A may be configured to receive the operation from the interface. The buffer 70A may be provided to capture the read operation and hold it for processing by the read spawn generator 72. In an embodiment, the buffer 70A may be a two entry "skid" buffer that permits a second operation to be captured in the event of delay for an unavailable resource to become available, for example, thus easing timing on propagating back pressure requests to the source(s) on the interface. The buffers 70B-70C may similarly be two entry skid buffers. Other embodiments may include additional entries in the skid buffers, as desired.

The read spawn generator 72 may be configured to decode the address of the read operation to determine which memory channel is addressed by the read operation. The read spawn generator 72 may be configured to transmit the read operation to the addressed memory channel via the Rd0 or Rd1 interface. In some embodiments, a read operation may overlap memory channels. Each read operation may specify a size (i.e. a number of bytes to be read beginning at the address of the operation). If the combination of the size and the address indicates that bytes are read from more than one channel, the read spawn generator 72 may be configured to generate multiple read operations to the addressed channels. The read data from the multiple read operations may be accumulated in the read buffer 84 to be returned to the source.

The read spawn generator 72 may also be configured to update the ROTT 76, allocating an entry in the ROTT 76 to track the progress of the read. Once the data has been received in the read buffer 84, the ROTT 76 may be configured to signal the read response generator 80 to generate a read response to transfer the data to the source. If read data is to be returned in order on the interface (e.g., according to the protocol on the interface), the data may remain buffered in the read buffer 84 until previous reads have been returned and then the ROTT 76 may signal the read response generator 80 to transfer the data. The ROTT 76 may be coupled to receive various status signals from the MCUs 56A-56B to update the status of the pending read operations (not shown in FIG. 4).

The buffer 70B, the write spawn generator 74, and the WOTT 78 may operate similarly for write operations. However, data is received rather than transmitted on the interface. The write data may be received in the write data forward buffer 88, and may be forwarded to the current location of the corresponding write operation. The WOTT 78 may signal for the write response once the write has been guaranteed to complete, terminating the writes on the interface with a write response earlier than might otherwise be possible.

It is noted that, while the embodiment illustrated in FIG. 4 includes an interface that conveys read and write memory operations separately (AR and AW, respectively), other embodiments may include a single transmission medium for both read and write operations. In such an embodiment, a single buffer 70 may receive the operations, and the read spawn generator 72 and the write spawn generator 74 may decode the command from the interface to differentiate read and write operations. Alternatively, there may be one spawn generator which generates both read and write operations and updates the ROTT 76 or the WOTT 78 accordingly.

Figure 5:
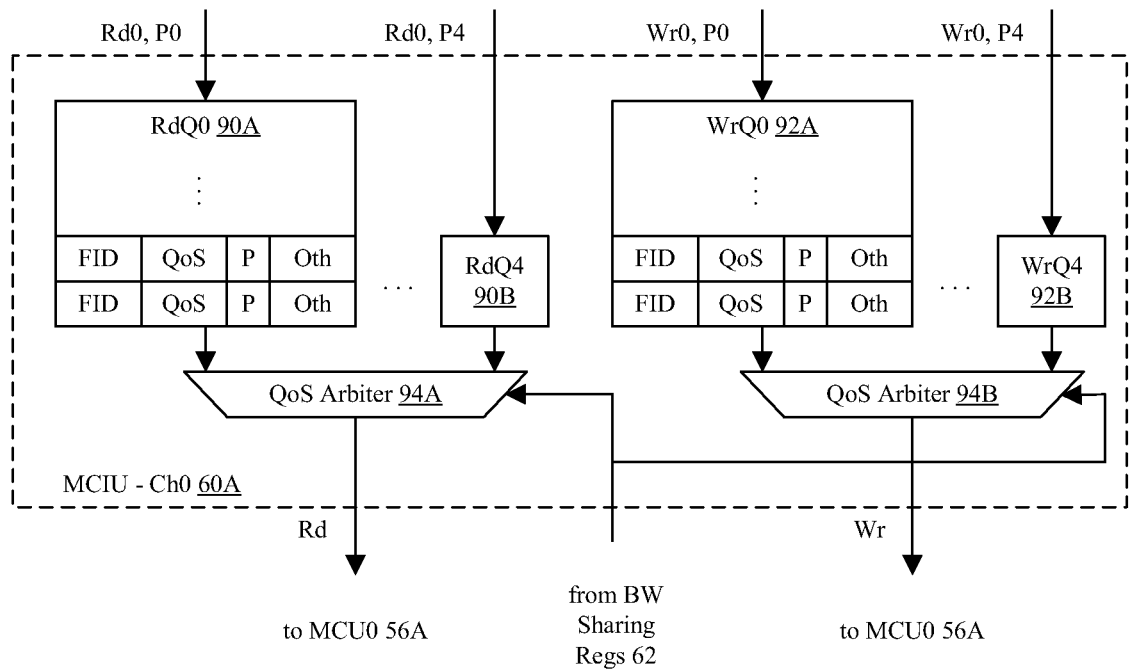
FIG. 5 is a block diagram of one embodiment of a memory channel interface unit that may be included in one embodiment of an agent interface unit shown in FIG. 3.

Turning now to FIG. 5, a block diagram illustrating one embodiment of the MCIU 60A is shown. The MCIU 60B may be similar except that it is coupled to receive the Rd1 and Wr1 inputs from each port and is coupled to the MCU 56B. In the illustrated embodiment, the MCIU includes a set of read queues such as read queues 90A-90B shown in FIG. 5 and a set of write queues such as write queues 92A-92B. There may be one read queue and one write queue for each port. Each read queue is coupled to the Rd0 output of one of the port interface units 58A-58E and is coupled to a QoS arbiter 94A. Each write queue is coupled to the Wr0 outputs of a respective one of the port interface units 58A-58E and to a QoS arbiter 94B. The outputs of the QoS arbiters 94A-94B are provided to the MCU 56A as read and write inputs, respectively. The QoS arbiters 94A-94B are coupled to receive data from the bandwidth sharing registers 62.

Two read queue entries are shown in the read queue 90A, and other read queues may be similar. The read queue 90A includes the FID of the memory operation, the QoS parameter of the operation, a push bit (P), and an other field (Oth). The FID and the QoS parameter may be the same values that were transmitted with the memory operation on the interface to the memory controller 40. Alternatively, one or both values may be recoded by the memory controller 40 for convenience internally. The push bit may be used to force a higher priority on a first memory operation if a second memory operation is ordered behind the first memory operation and is a higher QoS level than the first memory operation. For example, the second memory operation may be received on the same port as the first memory operation, and the interface on that port may require that data be returned in the same order that the memory operations are transmitted. By forcing the higher priority, the first memory operation may be performed more quickly and may thus permit a more rapid servicing of the second memory operation with the higher QoS level. The other field may include various other information for the memory operation (e.g., the address, size information). Similarly, two write queue entries are shown in the write queue 92A, and may include fields similar to the read queue 90A. The other field may store different information for writes as compared to reads, if desired.

The QoS arbiters 94A-94B may arbitrate among the read queues 90A-90B and the write queues 92A-92B, respectively. The QoS arbiters 94 may maintain the original ordering of memory operations from each source, such that newer memory operations may not be scheduled ahead of older memory operations from the same read queue 90.

Figure 6:
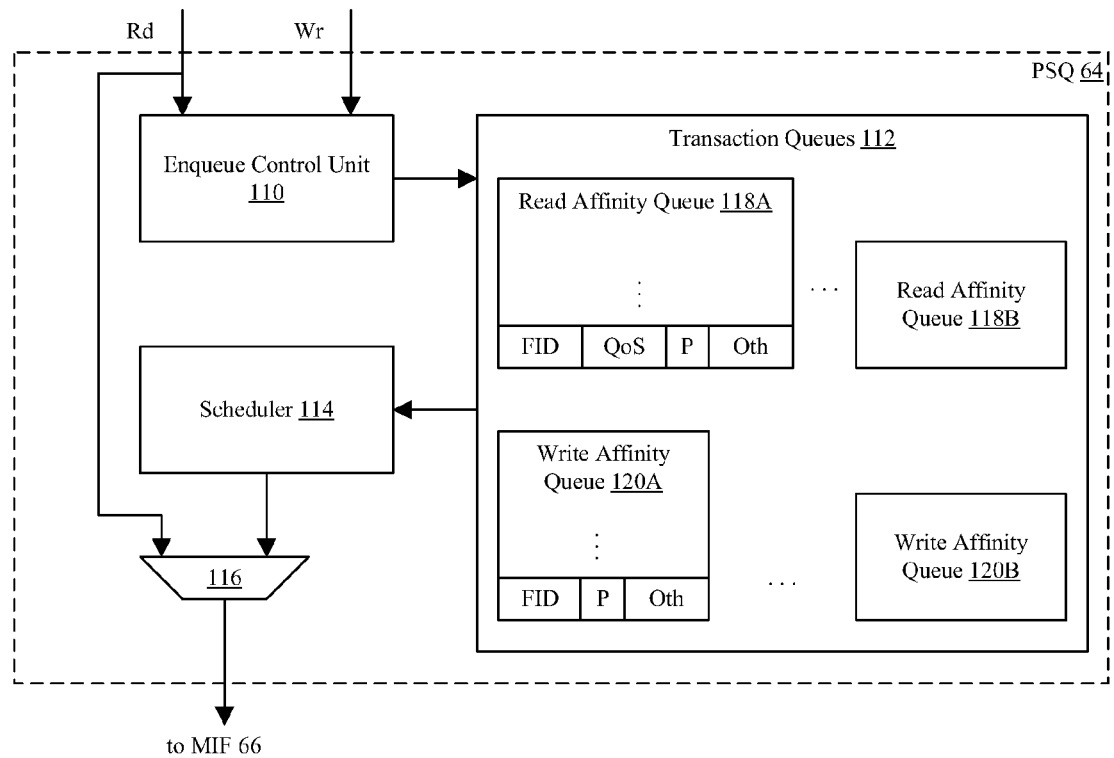
FIG. 6 is a block diagram of one embodiment of a presorting queue (PSQ) illustrated in a memory channel unit in FIG. 3.

Turning now to FIG. 6, a block diagram of one embodiment of the PSQ 64 is shown. In the illustrated embodiment, the PSQ 64 includes an enqueue control unit 110, a set of transaction queues 112, a scheduler 114, and a bypass mux 116. The enqueue control unit 110 is coupled to receive the read and write operations from the corresponding MCIU 60A or 60B, and is coupled to the transaction queues 112. The transaction queues 112 may also be coupled to receive push requests on a separate interface (not shown). The transaction queues 112 are further coupled to the scheduler 114, the output of which is coupled to the bypass mux 116. The bypass mux 116 is coupled to receive the read operation as well, and is configured to select between the memory operation scheduled by the scheduler 114 and the read operation. For example, the read operation may bypass the transaction queues 112 if there are no reads in the transaction queues 112 and the number of writes is below a threshold level. Other embodiments may not implement bypassing and the bypass mux 116 may be eliminated.

As illustrated in FIG. 6, the transaction queues 112 may include a set of read affinity queues such as queues 118A-118B and a set of write affinity queues such as queues 120A-120B. The number of read affinity queues and write affinity queues may vary from embodiment to embodiment, and the number of read affinity queues need not equal the number of write affinity queues. Each affinity queue may store one or more memory operations that have been determined by the enqueue control unit 110 to exhibit affinity with each other. Thus, as a memory operation is received by the enqueue control unit 110, the enqueue control unit 110 may be configured to compare the memory operation to the affinity queues 118A-118B (for a read operation) or the affinity queues 120A-120B (for a write operation). If the memory operation is affine, it may be enqueued in the corresponding affinity queue. If not, the memory operation may be enqueued in another affinity queue. In an embodiment, a read affinity queue may be reserved for reads that are not affine, and similarly a write affinity queue may be reserved for writes that are not affine.

The scheduler 114 may be configured to schedule memory operations to be transmitted to the MIF 66. For read operations, the scheduler 114 may be configured to consider both QoS levels in the read affinity queues 118A-118B and the number of affine memory operations in each read affinity queue 118A-118B. More details of one embodiment are described below. Generally, however, the scheduler 114 may be configured to favor read operations that have high QoS levels and larger numbers of affine memory operations. For write operations, the QoS levels may be eliminated in the PSQ 64. That is, the QoS levels of the write operations may be dropped as the write operations are written to the transaction queues 112. As illustrated in the exemplary entries in each of the queues 118A and 120A, the read operations may retain QoS while the write operations may not. The scheduler 114 may be configured to schedule between read operations and write operations based on fullness of the write queues and QoS levels in the read queues, for example.

It is noted that, in some embodiments, the read affinity queues 118A-118B and write affinity queues 120A-120B may be physically instantiated (e.g., as separate data structures or as one or more data structures that are divided via logic circuitry in the PSQ 64 and/or programmably separated). In other embodiments, the affinity queues may be virtual. That is, there may be a read queue and a write queue, for example, and tagging may be used to identify affine operations. It is further noted that, in addition to the circuitry illustrated in FIG. 6, there may be a data path (not shown) in the MCUs 56A-56B to transport write data from the AIU 54 to the memory and to transport read data from the memory to the AIU 54.

Figure 7:
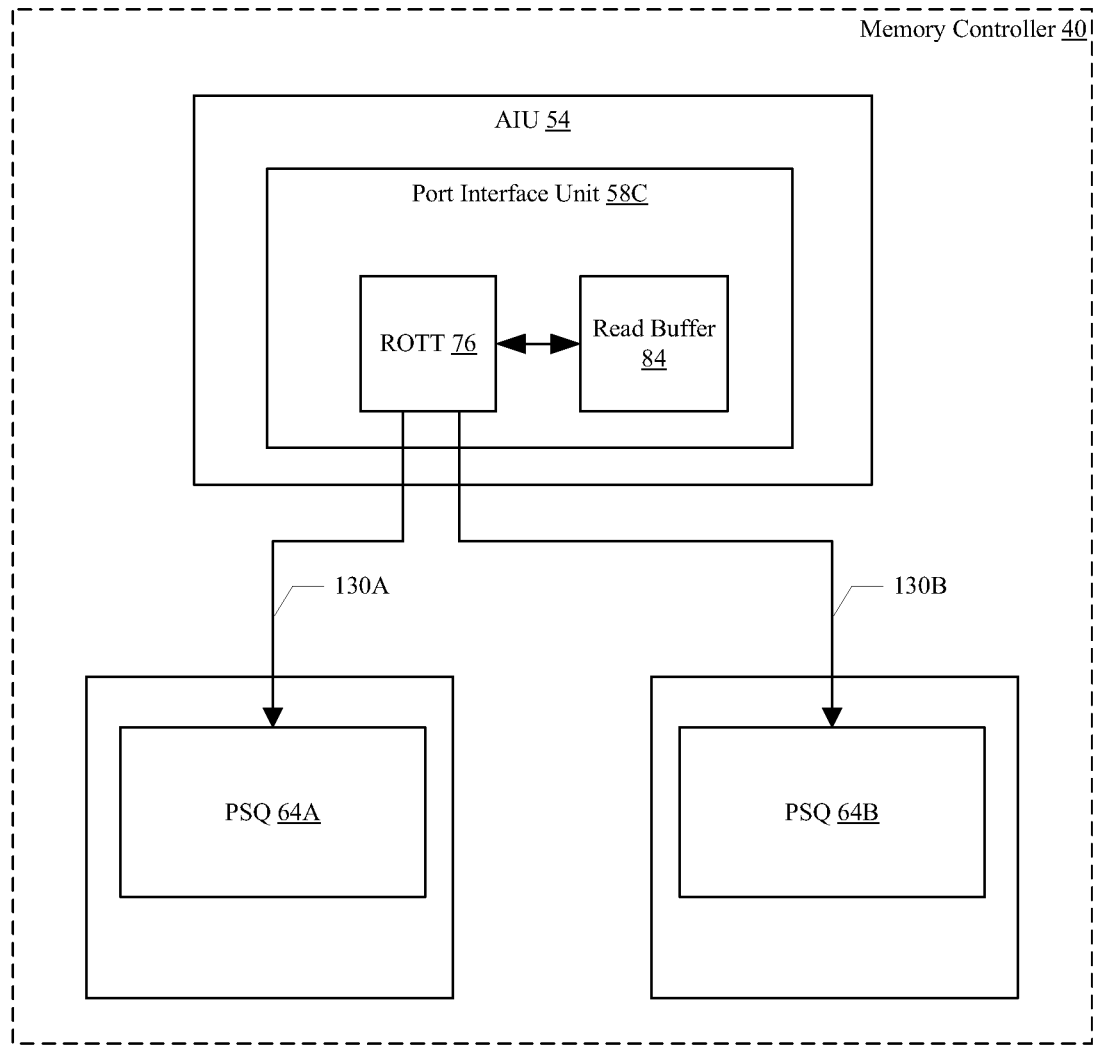
FIG. 7 is a block diagram of one embodiment of a portion of a memory controller.

Referring now to FIG. 7, a block diagram of a portion of a memory controller is shown. The memory controller 40 includes the AIU 54, which includes the port interface unit 58C. The port interface unit 58C includes the read outstanding transaction table (ROTT) 76 and the read buffer 84. The memory controller 40 also includes the MCU0 56A and the MCU1 56B, each of which includes a respective PSQ 64. It is noted that the memory controller 40 may include many other components and interfaces not shown in FIG. 7, and the components of the memory controller 40 may also include various other components and interfaces not shown in FIG. 7. It is also noted that in other embodiments, the memory controller 40 may include one MCU or more than two MCUs.

In one embodiment, the order of memory operations scheduled from PSQs 64A-B may be rearranged so as to maximize efficient use of the memory device bus. However, the originating requestor may require that memory operations are returned in the order in which the originating requester issued the memory operations to the memory controller 40. Therefore, the port interface unit 58C may reorder memory operation read data retrieved from memory back to the original order before the read data is forwarded to the originating requestor.

When data from a read memory operation is retrieved from memory, the data may be received by the port interface unit 58C on the data's return path to the requestor and stored in the read buffer 84. After the read data is received and stored in the read buffer 84, the ROTT 76 may determine if a prior memory operation is still outstanding. If there is a prior memory operation that has not been completed, then the read data for the just-received memory operation may wait in the read buffer 84 instead of being forwarded to the requestor. The AIU 54 may determine that a source enforces an order of how memory operations are returned, and as a result, the AIU 54 may reorder the memory operations to comply with the source's requirements. Additionally, the AIU 54 may send a request to the respective MCU 56 to accelerate the processing of one or more older blocking memory operations in response to determining data from one or more newer memory operations have been retrieved from memory but are waiting in the read buffer 84. The read data from the one or more newer memory operations may be ready to be returned to the source, but the enforcement of the order of memory operations may prevent the read data from being returned.

In various embodiments, the ROTT 76 may detect the return of data retrieved from memory when the data is written to the read buffer 84. The ROTT 76 may determine that data from a prior memory operation is preventing the just-returned data from being forwarded to the source. Therefore, in response, the ROTT 76 may send a request to the respective MCU 56 to expedite the prior memory operation. In one embodiment, the ROTT 76 may send a push request to the respective MCU 56. In another embodiment, the ROTT 76 may send an upgrade request to the respective MCU 56. The ROTT 76 may utilize paths 130A and 130B to send push/upgrade requests to MCU0 56A and MCU1 56B, respectively.

The PSQs 64A-B may include upgrade circuitry configured to upgrade a QoS level or set a push bit. In one embodiment, when the PSQ 64A or PSQ 64B receives a push/upgrade request, the respective PSQ 64 may upgrade the QoS level of the corresponding memory operation. In another embodiment, the respective PSQ 64 may set a push bit of the corresponding memory operation in response to receiving a push request. As a result, the processing of the corresponding memory operation may be accelerated, and the corresponding read data may be retrieved more quickly from the memory. Then, the corresponding read data may be returned to the port interface unit 58C and returned to the source.

Figure 8:
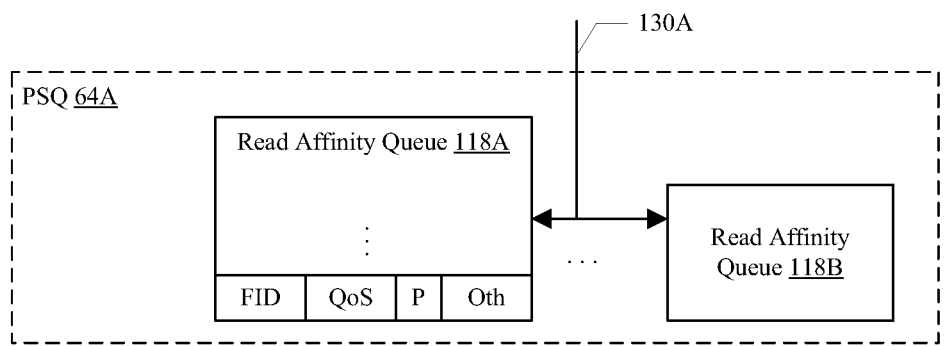
FIG. 8 is a block diagram of one embodiment of a portion of the PSQ shown in FIG. 6.

Turning now to FIG. 8, a block diagram illustrating one embodiment of a push request mechanism is shown. In this mechanism, receiving a push request for a memory operation may cause one of the read affinity queues 118A-B to set the push bit for the identified memory operation. A portion of the PSQ 64A of the MCU0 56A is illustrated in FIG. 8. The PSQ 64B in the MCU1 56B may be similar.

The PSQ 64A may receive memory operations from the MCIU 60A as previously discussed, and the PSQ 64A may queue the received memory operations in one of the read affinity queues 118A-B. The PSQ 64A may also receive push requests from one or more ROTTs 76 on interface 130A, and each push request may identify a memory operation that was previously received by the PSQ 64A. The PSQ 64A may locate the outstanding memory operation in one of the read affinity queues 118A-B using a received identifier, and then PSQ 64A may set the push (P) bit of the identified memory operation. In another embodiment, in response to receiving a push request, the PSQ 64A may upgrade the QoS level of the identified memory operation to a higher QoS level. In one embodiment, the read affinity queues 118A-B may include content addressable memories to locate the memory operation using the identifier received on interface 130A. In some cases, the identified memory operation may have already been forwarded out of PSQ 64A to a memory interface circuit (not shown).

Figure 9:
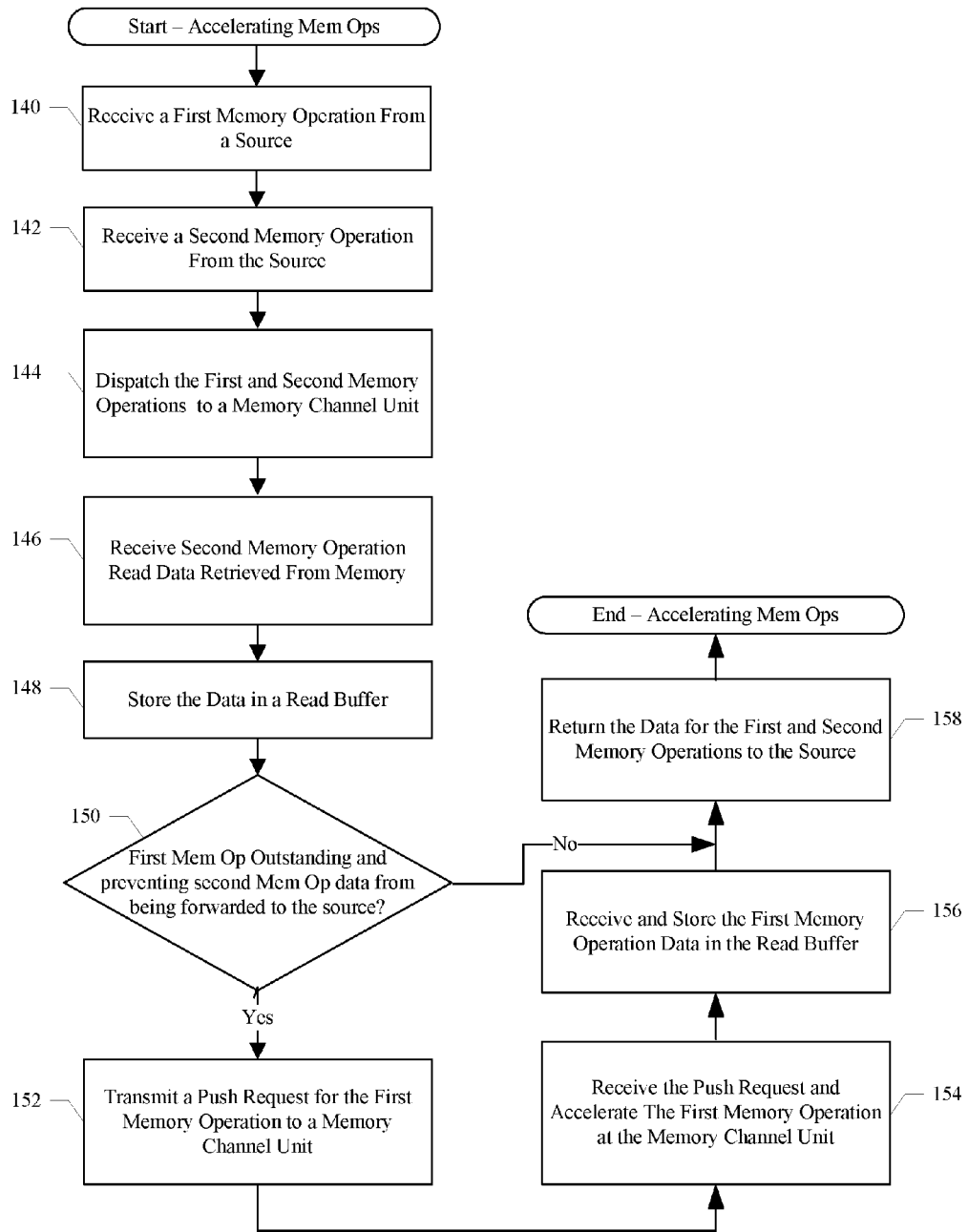
FIG. 9 is a flowchart illustrating one embodiment of a method for accelerating memory operations.

Referring now to FIG. 9, a flowchart of one embodiment of accelerating blocking memory operations is shown. While blocks are shown in a particular order for ease of understanding, other orders may be used. It should be noted that in various embodiments of the method described below, one or more of the blocks described may be performed concurrently or may be omitted entirely, and other additional blocks may also be performed as desired. Blocks may be performed in parallel in combinatorial logic in the memory controller 40 (of FIG. 3). Blocks, combinations of blocks, and/or the flowchart as a whole may be pipelined over multiple clock cycles. In one embodiment, the memory controller 40 may be configured to implement the operation illustrated in FIG. 7. More particularly, the agent interface unit (AIU) 54 may be configured to implement blocks 140-152 and 156-158, and the memory channel unit (MCU) 56 may be configured to implement block 154.

In one embodiment, a first memory operation may be received from a source (block 140). Next, a second memory operation may be received from the source (block 142). The first and second memory operations may be received by a memory controller. More particularly, the first and second memory operations may be received by a port interface unit of the memory controller. In one embodiment, the memory controller may include an AIU, and the AIU may include a port interface unit for each source coupled to the memory controller. Each port interface unit may maintain a table with an entry for each received memory operation that has not been completed. This table may be a read outstanding transaction table (ROTT). The source may enforce an order of memory operation read data returned from the memory controller, and the port interface unit may utilize the ROTT to determine the proper order for returning read data to the source.

In various embodiments, the memory controller may also include one or more memory channel interface units (MCIUs) and one or more MCUs. Each MCIU may be coupled to a respective MCU. The port interface unit may include a read spawn generator, and the read spawn generator may dispatch the first and second memory operations to a MCIU, and then the MCIU may dispatch the first and second memory operations to a MCU (block 144). The first and second memory operations may be dispatched to the MCU in their original order. The MCU may reorder the first and second memory operations in an effort to achieve greater memory efficiency. The MCU may retrieve data from memory for the second memory operation, and then the MCU may transmit the data to the port interface unit via the MCIU. The port interface unit may receive the second memory operation read data retrieved from memory (block 146). Then, the data may be stored in a read buffer in the port interface unit (block 148).

In one embodiment, the ROTT may detect that read data for the second memory operation has been received and is stored in the read buffer. The ROTT may also detect if the first memory operation is still outstanding (decision block 150) and is preventing the second memory operation read data from being forwarded to the source. In various embodiments, the ROTT may be configured to detect if the first memory operation is still outstanding in response to determining the source requires memory operations to be returned in the original order in which they are transmitted to the memory controller.

If it is determined that the first memory operation is not outstanding (decision block 150), such that read data for the first memory operation has already been retrieved and returned to the read buffer in the port interface unit, then the read data for the first and second memory operations may be returned to the source (block 158). The read data for the first memory operation may be returned to the source prior to the read data for the second memory operation. In some embodiments, the read data for the first memory operation may have already been returned to the source prior to block 158.

If the first memory operation is still outstanding (decision block 150), such that read data for the first memory operation has not been returned to the read buffer, then the port interface unit may transmit a push request for the first memory operation to the MCU (block 152). In one embodiment, the ROTT may transmit the push request for the first memory operation to the MCU. In various embodiments, the push request may include an identifier of the first memory operation, and the push request may be sent on a second path different than the first path used for sending memory operations from the port interface unit to the MCU (via the MCIU).

The MCU may receive the push request and then in response to receiving the push request, the MCU may accelerate the processing of the first memory operation (block 154). In various embodiments, the MCU may set a push bit of the first memory operation or the MCU may upgrade a QoS level of the first memory operation. As a result, the first memory operation may be scheduled to access memory faster than it otherwise would have been without the set push bit or the upgraded QoS level. Then, after the read data has been retrieved from memory and conveyed back to the port interface unit, the port interface unit may receive and store the first memory operation read data in the read buffer (block 156). After block 156, the read data for the first and second memory operations may be returned to the source (block 158).

Figure 10:
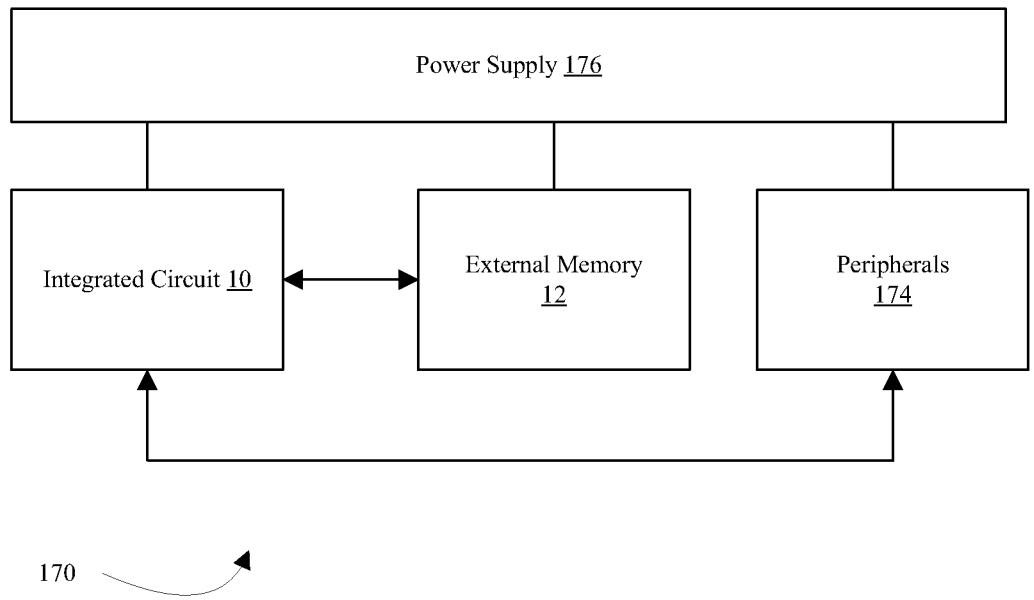
FIG. 10 is a block diagram of one embodiment of a system including an integrated circuit illustrated in FIG. 1.

Turning next to FIG. 10, a block diagram of one embodiment of a system 170 is shown. In the illustrated embodiment, the system 170 includes at least one instance of the integrated circuit 10 coupled to external memory 12 (e.g., the memory 12A-12B in FIG. 1). The integrated circuit 10 is coupled to one or more peripherals 174 and the external memory 12. A power supply 176 is also provided which supplies one or more supply voltages to the integrated circuit 10, the memory 12, and/or the peripherals 174. In some embodiments, more than one instance of the integrated circuit 10 may be included (and more than one external memory 12 may be included as well).

The peripherals 174 may include any desired circuitry, depending on the type of system 170. For example, in one embodiment, the system 170 may be a mobile device (e.g., personal digital assistant (PDA), smart phone, electronic reading device) and the peripherals 174 may include devices for various types of wireless communication, such as wifi, Bluetooth, cellular, global positioning system, etc. The peripherals 174 may also include additional storage, including RAM storage, solid state storage, or disk storage. The peripherals 174 may include user interface devices such as a display screen, including touch display screens or multitouch display screens, keyboard or other input devices, microphones, speakers, etc. In other embodiments, the system 170 may be any type of computing system (e.g., desktop personal computer, tablet computer, laptop, workstation, nettop).

Numerous variations and modifications will become apparent to those skilled in the art once the above disclosure is fully appreciated. It is intended that the following claims be interpreted to embrace all such variations and modifications.

What is claimed is:

1. A memory controller comprising:
one or more memory channel units; and
an agent interface unit configured to be coupled to one or more sources of memory operations, wherein the agent interface unit is configured to:
receive a first memory operation and a second memory operation from a source of said sources;
receive data corresponding to the second memory operation from a memory; and
accelerate processing of the first memory operation in response to determining:
data corresponding to the first memory operation must be forwarded to the source prior to the data corresponding to the second memory operation;
data corresponding to the first memory operation has not yet been retrieved from the memory; and
an amount of data stored in a read buffer of the agent interface exceeds a given threshold.

2. The memory controller as recited in claim 1, wherein the agent interface unit is further configured to:
transmit memory operations to a given memory channel unit on a first path; and
transmit push requests to the given memory channel unit on a second path different from the first path.

3. The memory controller as recited in claim 2, wherein the agent interface unit comprises a table for storing entries of outstanding memory operations, and wherein the table is configured to convey push requests on the second path.

4. The memory controller as recited in claim 2, wherein the agent interface unit comprises one or more port interface units, wherein each port interface unit is coupled to a respective source, and wherein each port interface unit comprises a table for storing entries of outstanding memory operations.

5. The memory controller as recited in claim 4, wherein each port interface unit is configured to read a corresponding entry in the table to detect that data corresponding to a memory operation has not yet been retrieved from the memory.

6. The memory controller as recited in claim 4, wherein the port interface unit comprises a read spawn generator, wherein the read spawn generator is configured to transmit memory operations to a respective memory channel unit on the first path.

7. The memory controller as recited in claim 1, wherein the agent interface unit is further configured to determine that a respective source requires memory operations to be returned in an original order in which the memory operations were transmitted by the respective source.

8. The memory controller as recited in claim 7, wherein the agent interface unit is further configured to reconstruct an original order of memory operations prior to returning data corresponding to memory operations to a respective source.

9. A memory controller comprising:
an interface configured to be coupled to one or more sources of memory operations; and
one or more memory channel units, each of the one or more memory channel units configured to interface to a memory;
wherein a port for a given source of the one or more sources on the interface is configured to:
receive read data awaiting forwarding to a given source; and
accelerate a given memory operation in response to:
receiving said read data;
identifying the given memory operation as a memory operation which is preventing forwarding of said read data; and
an amount of data stored in a read buffer of the interface exceeds a given threshold.

10. The memory controller as recited in claim 9, wherein the port is further configured to send an identification of said given memory operation to a memory channel unit, wherein the port is further configured to determine to which respective memory channel unit to send the identifier based on a corresponding entry from a read outstanding transaction table.

11. The memory controller as recited in claim 9, wherein each memory operation of the plurality of memory operations is accompanied by a quality of service (QoS) parameter that may be modified by a memory channel unit.

12. The memory controller as recited in claim 10, wherein the respective memory channel unit is configured to set a push bit of an oldest outstanding memory operation responsive to receiving the identifier.

13. A method comprising:
receiving a first memory operation and a second memory operation from a source, wherein the second memory operation is received subsequent to the first memory operation;
receiving data retrieved from a memory, wherein the data is associated with the second memory operation;
storing the data in a buffer; and
accelerate processing of the first memory operation in response to determining:
  data corresponding to the first memory operation must be forwarded to the source prior to the data corresponding to the second memory operation;
  data corresponding to the first memory operation has not yet been retrieved from the memory; and
  an amount of data stored in a read buffer exceeds a given threshold.

14. The method as recited in claim 13, further comprising maintaining a table, wherein the table indicates an order of memory operations received from the source.

15. The method as recited in claim 13, further comprising dispatching the first memory operation to the memory channel unit prior to the second memory operation.

16. The method as recited in claim 13, further comprising the memory channel unit setting a push bit of the first memory operation responsive to receiving the push request.

17. The method as recited in claim 13, further comprising scheduling the second memory operation to access the memory prior to the first memory operation responsive to determining that reordering the first and second memory operations will result in an increase in memory efficiency.

18. A system comprising:
one or more devices configured to transmit memory operations; and
a memory controller coupled to the one or more devices and coupled to one or more memory devices, wherein the memory controller is configured to:
  receive an indication that a second memory operation has been completed, wherein the second memory operation was received from a given device subsequent to receiving a first memory operation; and
  accelerate processing of the first memory operation in response to determining:
    data corresponding to the first memory operation must be forwarded to the source prior to the data corresponding to the second memory operation;
    data corresponding to the first memory operation has not yet been retrieved from the memory; and
    an amount of data stored in a read buffer of the controller exceeds a given threshold.

19. The system as recited in claim 18, wherein the given device requires the first memory operation and the second memory operation be completed in order.

20. The system as recited in claim 19, wherein the request to expedite the first memory operation is an upgrade request, and wherein the respective memory channel unit is configured to raise a quality of service level of the first memory operation responsive to receiving the upgrade request.

21. The system as recited in claim 19, wherein the request to expedite the first memory operation is a push request, and wherein the respective memory channel unit is configured to set a push bit of the first memory operation responsive to receiving the push request.

22. The system as recited in claim 19, wherein the memory controller is further configured to determine that a first memory operation has not yet been completed responsive to determining that the given device enforces an order in which memory operations are returned from the memory controller.

\* \* \* \* \*